United States Patent
Spencer, Jr.

(10) Patent No.: US 7,305,397 B2
(45) Date of Patent: Dec. 4, 2007

(54) CACHING DATA COMMUNICATIONS TO REDUCE LATENCY

(75) Inventor: Herman Spencer, Jr., Las Vegas, NV (US)

(73) Assignee: Tririga LLC, Las Vagas, NV (US)

( * ) Notice: Subject to any disclaimer, the term of this patent is extended or adjusted under 35 U.S.C. 154(b) by 142 days.

(21) Appl. No.: 10/356,363

(22) Filed: Jan. 31, 2003

(65) Prior Publication Data
US 2004/0044672 A1 Mar. 4, 2004

Related U.S. Application Data

(60) Provisional application No. 60/353,911, filed on Jan. 31, 2002.

(51) Int. Cl.
*G06F 7/00* (2006.01)
(52) U.S. Cl. .............. 707/100; 707/1; 707/104.1; 700/182
(58) Field of Classification Search ......... 707/100, 707/2, 104.1; 700/182, 184
See application file for complete search history.

(56) References Cited

U.S. PATENT DOCUMENTS

| | | | | |
|---|---|---|---|---|
| 5,179,651 A | * | 1/1993 | Taaffe et al. ............. | 345/555 |
| 5,201,046 A | * | 4/1993 | Goldberg et al. ......... | 707/100 |
| 5,261,069 A | * | 11/1993 | Wilkinson et al. ....... | 711/145 |
| 5,305,389 A | * | 4/1994 | Palmer ..................... | 382/305 |
| 5,734,898 A | * | 3/1998 | He .......................... | 707/203 |
| 5,987,502 A | * | 11/1999 | Banks et al. ............. | 709/203 |
| 6,256,712 B1 | * | 7/2001 | Challenger et al. ...... | 711/141 |
| 6,295,513 B1 | * | 9/2001 | Thackston ................ | 703/1 |
| 6,542,920 B1 | * | 4/2003 | Belkin et al. ............. | 718/104 |
| 6,601,062 B1 | * | 7/2003 | Deshpande et al. ...... | 707/3 |
| 2001/0042094 A1 | * | 11/2001 | Mitchell et al. .......... | 709/203 |
| 2001/0047251 A1 | * | 11/2001 | Kemp ...................... | 703/1 |
| 2002/0010798 A1 | * | 1/2002 | Ben-Shaul et al. ....... | 709/247 |
| 2003/0028779 A1 | * | 2/2003 | Rowe ....................... | 713/180 |

OTHER PUBLICATIONS

Franklin et al., "Transactional Client-Server Cache Consistency: Alternatives and Performances", Sep. 1997, ACM Transactions on Database Systems, vol. 22, No. 3, pp. 315-363.*

* cited by examiner

*Primary Examiner*—Wilson Lee
*Assistant Examiner*—Michael Le
(74) *Attorney, Agent, or Firm*—Vierra Magen Marcus & DeNiro LLP

(57) ABSTRACT

A system for allowing applications to communicate data to a database on a host system run by a system administrator. In one embodiment, the system may perform several caching functions of data passing between a database and a user on a CAD system.

25 Claims, 16 Drawing Sheets

| | | | | | | | | | Number | 1-21 | | Revision | | | 3 |
|---|---|---|---|---|---|---|---|---|---|---|---|---|---|---|---|
| | | | | | | | | | Name | Office101-wf-1 | | Item Type | | | Interior - typ |
| | | | | | | | | | Status | Revisions In Progress | | Discipline | | | I - Interiors |
| | | | | | | | | | Classification | 09700 - Wall Finishes | | Source | | | Project |

| Select | Number | Name | UOM | Per Item Spec Quantity | 1-21 Pct Waste | Abs Waste | Include in Item Cost | Customer-Supplied | Show in PO Line Item | Show Attributes | Show Components |
|---|---|---|---|---|---|---|---|---|---|---|---|
| ☐ | 1-15 | typ-cr-02 | feet | 1.0 | 0.0 | 0.0 | ☐ | ☐ | ☐ | ☐ | ☐ |
| ☐ | 1-20 | wallpaper-white-06 | feet | 2.0 | 0.0 | 0.0 | ☐ | ☐ | ☐ | ☐ | ☐ |
| ☐ | 1-18 | tile-white-3 | each | 1.0 | 0.0 | 0.0 | ☐ | ☐ | ☐ | ☐ | ☐ |

*FIG. 13*

Number: 1-13  Revision: 0
Name: Office101-wt-1  Item Type: Interior Walls
Status: Work In Progress  Discipline: A - Architectural
Classification: 02060 - Wall Types  Source: Project

| Select | Number | Name | UOM | Per Item Spec 1-13 Quantity | Pct Waste | Abs Waste | Include in Item Cost | Customer-Supplied | Show in PO Line Item | Show Attributes | Show Components |
|---|---|---|---|---|---|---|---|---|---|---|---|
| ☐ | 1-3 | 12-2x4-wb | each | 2.0 | 0.0 | 1.0 | ☑ | ☐ | ☐ | ☐ | ☐ |
| ☐ | 1-7 | 8-2x4-bat | each | 2.0 | 0.0 | 0.0 | ☑ | ☐ | ☐ | ☐ | ☐ |
| ☐ | 1-10 | insulation-oc-12 | each | 8.0 | 0.0 | 0.0 | ☑ | ☐ | ☐ | ☐ | ☐ |
| ☐ | 1-12 | 5/8-Gypbrd | each | 1.6 | 0.0 | 3.0 | | | ☐ | ☐ | ☐ |

*FIG. 14*

CACHING DATA COMMUNICATIONS TO REDUCE LATENCY

PRIORITY DATA

The present application claims priority to U.S. Provisional Patent Application No. 60/353,911, filed Jan. 31, 2002, entitled "INTELLIGENT BUSINESS SYSTEM CACHE MANAGER."

BACKGROUND OF THE INVENTION

1. Field of the Invention

The present invention is directed to a system for enabling data to interact with a data structure via the Internet.

2. Description of the Related Art

Designing and building a project is a long and complicated process that requires the diverse services of many participants. These design and build participants may include architects, structural engineers, mechanical engineers, electrical engineers, interior designers, etc. who are responsible for creating the design drawings for the project. The participants may include purchasing agents who are responsible for purchasing components (e.g., furniture, fixtures and equipment, etc.) for integration into the project. Contractors and subcontractors are needed to actually build the project according to the design plans. Expeditors are often needed to receive and route purchased components to the construction site when needed by contractors and subcontractors. The project participants may further include accountants who are responsible for tracking the project's fiscal budget and paying for components purchased. A project manager may manage the participants, for example, by approving some or all changes to the project requested by the participants. Additionally, the project owner's participation is often needed to insure that the project progresses to his satisfaction from initial conception through completion.

A project typically involves many phases including design and build phases. These phases often overlap and each is highly dynamic. The design phase usually starts with one or more design professionals creating initial design drawings (e.g., prints) of the final project according to a developer's direction. The prints generally include perimeter lines representing specific areas (e.g., restaurants, rooms, lobbies, offices, etc.) within the project. The prints may also include graphical representations of components within the specified areas. For example, an architect may create prints of a restaurant area of a Hotel/Casino project. The restaurant prints may include graphical representations of furniture, fixtures, mechanical equipment, electrical equipment, etc. Examples include tables, windows, ovens, refrigerators, a backup power generator, etc. The project may start with many different sets of prints, all related to each other.

The initial prints or sets of prints, once completed, are provided to several other participants involved in the design and build process. For example, the restaurant prints example above may be provided to one or more structural engineers, mechanical engineers, electrical engineers and interior designers for their review, modification, and/or supplementation. These project participants may add further graphical representations of components to the initial set of prints. An interior designer of the project may wish to add graphical representations of additional components such as chairs or art work to a dining room sub-area of the example restaurant blueprint above. A structural engineer may also seek to add graphical representations of components to the restaurant prints such as a platform on which the backup power generator (graphically represented in the print) rests. Often times different participants may receive different sets of prints which are related to each other.

When project participants (e.g., engineers, interior designers, etc.) receive initial prints of the project, the prints give very little information about the components graphically represented therein. Typically, the prints simply identify the components by title or type (e.g., "a table," "a window," "a backup power generator"). It is usually the responsibility of the engineers, interior designers, etc., to further define or specify the characteristics or attributes of components originally contained in the prints or components added to the prints. Some of this information may be entered onto the prints by the engineers or designers. However, it is more likely that a separate specification sheet is created by the engineers or designers for each component graphically represented on the print. Thus, an interior designer may create a separate specification sheet for each type of chair graphically represented in the restaurant print, wherein each specification sheet contains descriptive information (size, color, fabric, whether the fabric is treated, etc.) regarding a respective chair. Likewise, an electrical engineer may, for example, create a separate specification sheet for the graphically represented backup power generator describing, for example, the generator's size, power generation capacity, weight, etc.

Engineers and designers normally employ software applications for generating specification sheets for project components for which they have responsibility. These software applications generate electronic versions of specification sheets into which engineers or interior designers hand enter descriptive information of the corresponding component. Additionally, a reference to a graphical representation in a print is normally entered into each specification sheet so that each specification sheet can be associated with the respective component represented on the prints.

Existing electronic specification sheets are arranged as flat files, templates, or spreadsheets. Once the engineers or designers finish authoring their specification sheets, the specification sheets are provided to other project participants for their review, modification, supplementation, and/or approval. The specification sheets can be sent as e-mail attachments if the recipient has a computer system with appropriate software applications for accessing the attachments. Alternatively, copies of the specification sheet may be printed and distributed. One copy is normally saved by the author as the original specification sheet either in electronic version form, hard copy form, or both, for archiving purposes. It is noted that except for the reference mentioned above, the specification sheets, either in hard copy or e-mail attachment form, are distributed physically separated from corresponding prints.

One or more revisions to each of the specification sheets may occur throughout the design and build process. Indeed, revisions to a specification sheet can occur even after the corresponding component has been purchased. In this latter case, the purchased component, if it can be found, would normally be returned to its manufacturer and the purchase price refunded less restocking fees.

Specification sheet revisions may occur for a variety of reasons by a variety of project participants. For example, the project owner, upon receipt of a specification sheet for one type of the restaurant chairs, may desire the chair color to be different than originally specified by an interior designer, or the project owner may decide that the chair as originally specified would be too expensive. Another interior designer for the project, upon receipt of the same specification sheet for the restaurant chair, may notice that the originally specified fabric did not include a fire treatment in accordance with local fire codes. The structural engineer, upon receipt of the specification sheet for the backup power generator, may notice that his platform may not support the weight of the backup generator specified by the electrical engineer. At any rate, it is apparent that the specification sheets may be subjected to several iterative revisions.

Each reason for revision is communicated to the original author who, in response, revises the specification sheet in accordance thereto. Once revised, the specification sheet is redistributed to other project participants for further review, modification, supplementation, and/or approval. It is noted that the original specification sheet author usually has the responsibility for maintaining a history of all revisions to his specification sheet, and the responsibility that all necessary project participants have the most up to date version of his specification sheet.

Once a specification sheet for a component has been approved by all the necessary project participants, it may be submitted to the project's purchase agent. The purchase agent, in turn, may create a purchase order for the component using information from the specification sheet. The purchasing agent, like the project engineers and interior designers, may employ a computer system executing specialized software for generating an electronic purchase order sheet. Typically, the purchasing agent transfers specification sheet information by hand into the electronic purchase order sheet, and subsequently sends the purchase order sheet to manufacturers via hard copy or e-mail attachment. A copy of the purchase order is also typically sent to the project's accountant. This data may also be sent to the original specifier to update the specification sheet As noted above, the design and build process involves a substantial number of participants. The complexity of large-scale construction projects often necessitates contributions from a corresponding large number of design and build participants. Indeed, the design and construction of modern Hotel/Casinos often require teams of architects, interior designers, purchasing agents, etc., whereas the design and construction of a stand alone retail store may only require the services of a single architect, interior designer, purchasing agent, etc. Nonetheless, each project participant requires collaboration and an exchange of information including design plans, specification sheets, etc., with one or more of the other project participants for the project to progress efficiently and effectively to completion.

Collaboration and the exchange of information, including prints and specification sheets, between design and build participants adds to the complexity of each project. Effective and efficient collaboration and information exchange is often the single most important key to bringing a project to fruition in a quality, timely and cost effective manner. However, as more fully exemplified above, collaboration and information exchange between participants, is typically a chaotic process.

Co-pending application Ser. Nos. 10/020,552, 10/015,903, 10/016,615, 10/021,661 and 09/519,935 disclose an Intelligent Business System which allows participants to collaborate with each other. The system includes a central data store and applications which communicate with the store via a network such as the Internet. With the amount of data passing between the collaborators and the store, one must ensure accurate and latency free data exchange.

Mechanisms which enable efficient communication between the collaborators, and specifically the applications running on the participants processing devices, to communicate with the data store, are useful in creating efficiencies within collaboration projects.

SUMMARY OF THE INVENTION

The present invention, roughly described, pertains to a system for allowing applications to communicate data to a database on a host system run by a system administrator. In a further aspect, the present invention relates to a system and method for linking computer aided design (CAD) elements with non-graphical information within a database. The principles of the invention may be extended beyond this particular embodiment for use with CAD applications in a design and build, and facilities management environment, to include embodiments of systems where data is required to be provided in significant amounts to a database.

In one embodiment, the system may perform several caching functions of data passing between the database and the user on a CAD system, and hence is referred to herein as a cache manager.

In one aspect, the invention is a method of controlling communications between a client computer and a server computer having a database. The method includes the steps of: invoking a data manager application, wherein the data manager application intercepts application server requests and data change requests; assigning a unique identifier to each data instance; queuing data on the data manager application prior to transmitting the data to the server; and transmitting data to the server.

In a further aspect, the invention is a data management system for reducing latency in data communications between a client application and a central database. The system includes a communication agent resident in a client application, outputting data; a cache manager application receiving data from the agent; a disk queue storing at least selected portions of data from the communication agent; and an encoder retrieving the data and serializing the data for output to a network.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. These and other objects and advantages of the present invention will appear more clearly from the following description in which the preferred embodiment of the invention has been set forth in conjunction with the drawings.

BRIEF DESCRIPTION OF THE DRAWINGS

The invention will be described with respect to the particular embodiments thereof. Other objects, features, and advantages of the invention will become apparent with reference to the specification and drawings in which:

FIG. 13 is a portion of a specification for a virtual area.

FIG. 14 is a portion of a wall specification used in accordance with the present invention.

DETAILED DESCRIPTION

Figure 1:
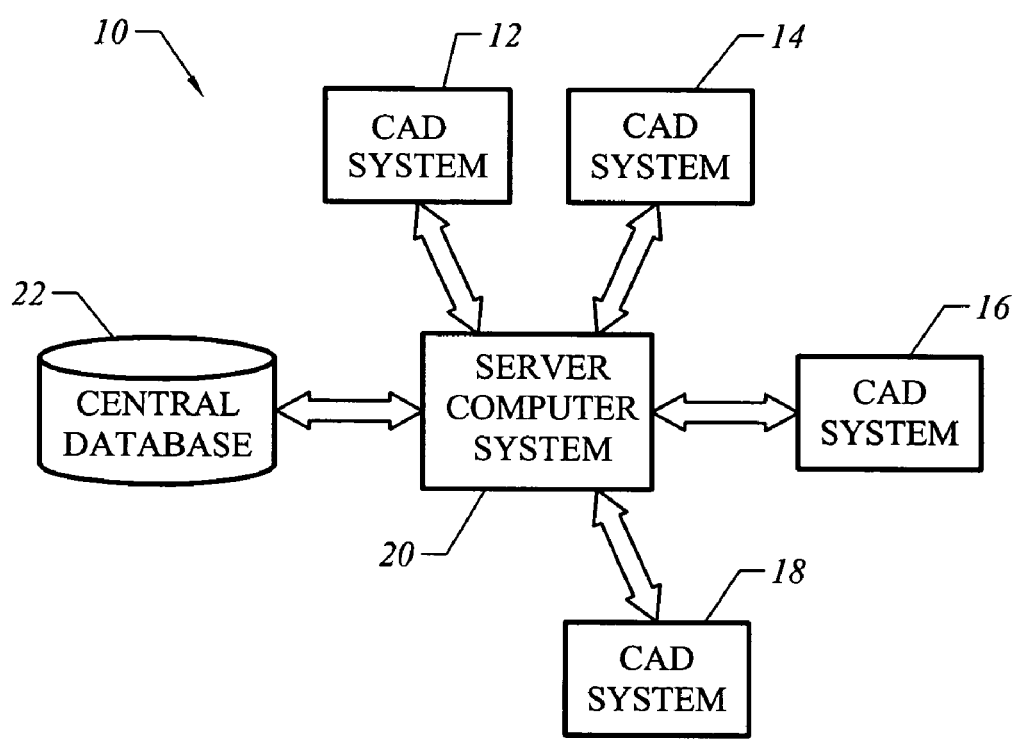
FIG. 1 is a block diagram depicting an overview of one embodiment of a system in which the present invention may be utilized.

In one aspect, the system of the present invention comprises a system for allowing applications to communicate data to a database on a host system run by a system administrator. In a further aspect, the present invention relates to a system and method for linking computer aided design (CAD) elements with non-graphical information within a database. The present invention will be described with reference to the design and/or building of a construction project, it being understood that the present invention may find application in other disciplines. The principles of the invention may be extended beyond this particular embodiment for use with CAD applications in a design and build, and facilities management environment, to include embodiments of systems where data is required to be provided in significant amounts to a database The present invention will be described with reference to its use with an Intelligent Business System in the design and build of a large or complicated building construction project. The system is particularly useful with the system described in co-pending United States Patent Applications: BUSINESS ASSET MANAGEMENT SYSTEM, U.S. patent application Ser. No. 10/020,552 filed Oct. 30, 2001 (co-pending PCT Patent Application Ser. No. PCT/US01/47965); ITEM SPECIFICATION OBJECT MANAGEMENT SYSTEM, U.S. patent application Ser. No. 10/015,903 filed Oct. 30, 2001; BUSINESS ASSET MANAGEMENT SYSTEM USING VIRTUAL AREAS, U.S. patent application Ser. No. 10/016,615 filed Oct. 30, 2001; INTELLIGENT OBJECT BUILDER, U.S. patent application Ser. No. 10/021,661 filed Oct. 30, 2001 (co-pending PCT Patent Application Ser. No. PCT/US01/48449); and INTEGRATED BUSINESS SYSTEM FOR THE DESIGN, EXECUTION, AND MANAGEMENT OF PROJECTS, U.S. patent application Ser. No. 09/519,935 filed Mar. 7, 2000, all depict one or more aspects of a comprehensive design and build system which enables users to connect intelligent data to drawings, elements of the drawings, or specific "virtual areas" of the drawings, and share such intelligent data with other authorized users of the systems. The concept of a "virtual area" is discussed in above-referenced application Ser. No. 10/016,615. Polylines can be used to mark and denote such virtual areas. U.S. Provisional Application Ser. No. 60/398,924 entitled CAD VIRTUAL AREA LOCATER, filed Jul. 26, 2002 presents a virtual area markup tool. Each of the aforementioned applications is hereby specifically incorporated by reference in its entirety herein.

The foregoing applications present a complete design—build—management solution to the tasks involved in overseeing and managing construction, manufacturing, and maintaining assets such as buildings, ships, airplanes and the like. In one aspect, the system an enterprise system, Application Service Providers (ASP) platform, and open architecture system which provides application toolsets that allow multiple participants in projects, automation of bidding and estimating processes, accuracy and efficiency in purchasing, integration with existing applications, and simple but secure access over the Internet or a private network. The system captures and manages information throughout the design, build, and manage phases of the resulting asset. Each of the aforementioned applications is hereby specifically incorporated by reference in its entirety herein.

In these systems, all data is available in real-time, providing consistent information throughout a project's lifecycle. Even after an asset has been built, an owner or property manager can access the system to derive specific information within a few seconds. This system can be applied to any number of design and build industries, including: Hospitality, Civil and Electrical Infrastructure; Telecom; Commercial, Residential, and Government Buildings; Manufacturing; Aerospace and Nautical applications; and Automobile, Railways, and Public Transportation projects.

The system provides this solution to users in real time, so that all information modified by users is instantly available to other users in the system, creating even greater efficiency. In order to allow such a system to be built in an Application Service Provider model, where one or more components are provided on a host server (usually using a World Wide Web based server/client model), since a large quantity of data will constantly be moving from the client to the server and back, a mechanism is required to ensure minimal latency in the exchange of data.

The following terms may be used throughout the specification and are defined as follows:

Attribute: A quality of characteristic inherent in or ascribed to an item specification.

Business Object: An article used in the conducting of business, such as a schedule of items, a letter, an email, a purchase order, a request for quotation, and the like.

CAD: Acronym for "Computer-aided design." Computer-aided design software is used by architects, engineers, drafters, artists and others to create precision drawings or technical illustrations. CAD software can be used to create two-dimensional (2-D) drawings or three-dimensional (3-D) models.

Classification: The system of the present invention recognizes data classifications as a category or class of item types. The classification tree displays the classes in a hierarchal fashion.

Company: An organization or group that performs services or provides products within the system. A business enterprise; a firm. Individual company defaults and standards revolve around a company.

Component: The system supports components as a part of an Item Specification. A component is an existing Item Specification associated to another item specification; together, they make up a whole item or an assembly. An Item Specification can have multiple components.

Item Specification: The detail information about objects involved in building the parts and components of something. An example of an item would be a desk; an example of the item specification would be the description of the desk (height, width, depth, color, material, and so forth), its manufacturer(s), costs, delivery options, catalog numbers, and so forth.

Item Type: A template for creating item specifications for broad categories of items. For example: a user might have an item type of "office furniture," this item type forms a template a user would use to create the many item specifications for various desks required.

Schedule: A schedule is a list of specified items, a reference number, a version number and the item status information. The system provides the ability to generate schedules, either by type or instance, for the entire project or specific virtual areas.

The foregoing terminology is used herein for convenience in understanding the present invention. It should be understood that the aforementioned definitions are not intended as limiting the scope of the present invention to the particular terms which are defined. Other nomenclature may be used to represent the concepts and substance of the foregoing definitions.

In a further aspect, the system, including all components thereof other than a local computer, may be supplied by a System Administrator. The System Administrator may host the applications databases, and provide assistance to users of the system at all levels in using the application. In this embodiment, the System Administrator enables the application server for internet access such that the client computers may be positioned at remote sites, such as the physical location of each of the members of the design team, purchasers, contractors and the like, allowing all users to communicate data to the application server via a secure protocol. The administrator may offer access to the application server, store data and customer service as a service for which the System Administrator collects a fee.

FIG. 1 shows in block diagram form a system employing the present invention. System 10 includes several CAD systems 12-18 in data communication with a server computer system 20. Exemplary CAD systems include AUTOCAD by AUTODESK, INC. and MICROSTATION by BENTLEY SYSTEMS, INC. Server computer system 20, in turn, is in data communication with a central database 22. Central database 22 may take form in a relational, object oriented or distributed database. CAD systems 12-18 may be in communication with server system 20 via a public, private or combination of public and private networks, such as the Internet 200.

Figure 2:
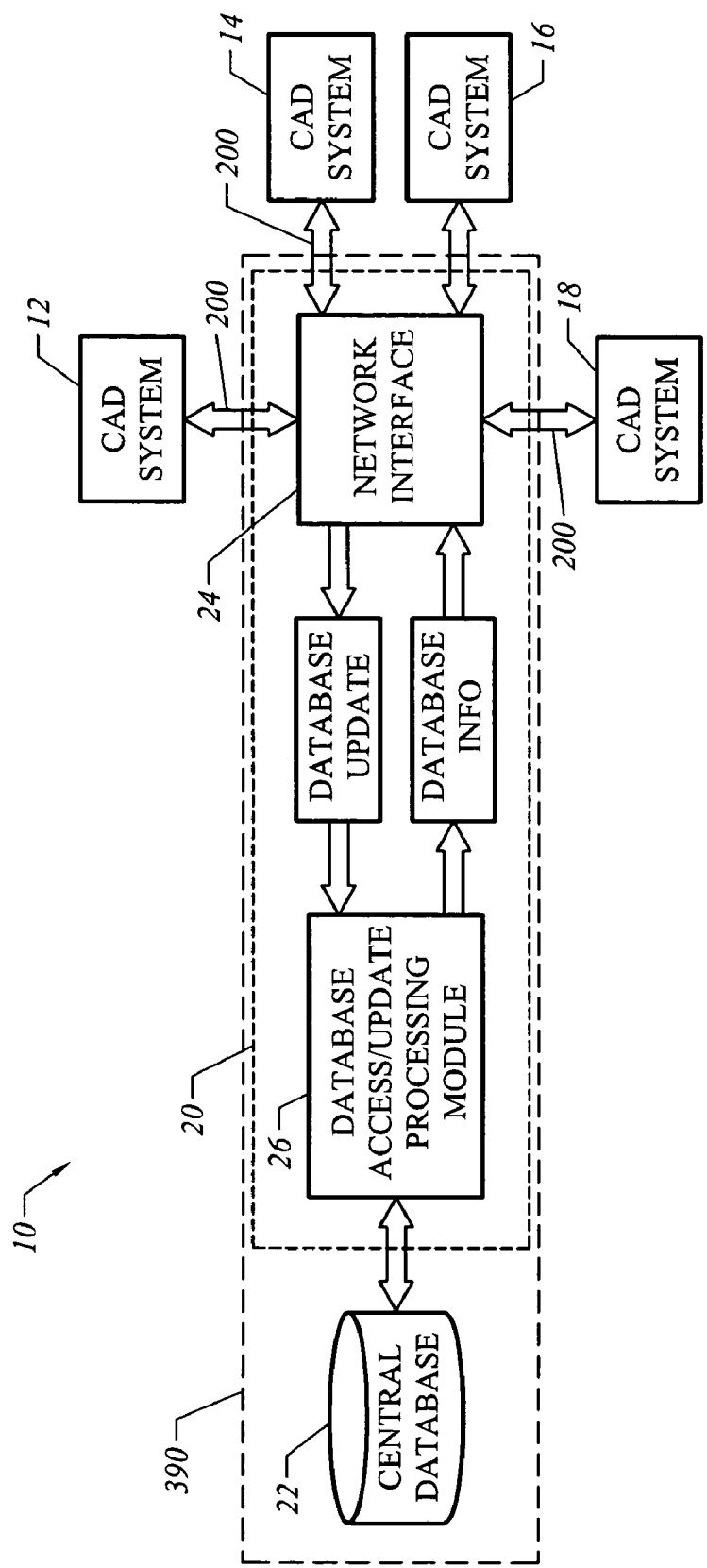
FIG. 2 is a more detailed block diagram depicting certain components of the processing modules of the invention.

FIG. 2 shows in block diagram form, a more detailed view of system 10. In FIG. 2, the host system 390 provided by the system administrator includes system 20 and a network interface 24 in data communication with CAD systems 12-18. Additionally, system 20 includes a database access/update processing module 26 in data communication with central database 22. Module 26 may include application servers which provide applications which perform several functions including those described in U.S. patent applications Ser. Nos. 10/020,552, 10/015,903, 10/016,615, 10/021,661 and 09/519,935. Processing module 26 and network interface 24 communicate with each other via database update messages 30 and database information messages 32.

Figure 3A:
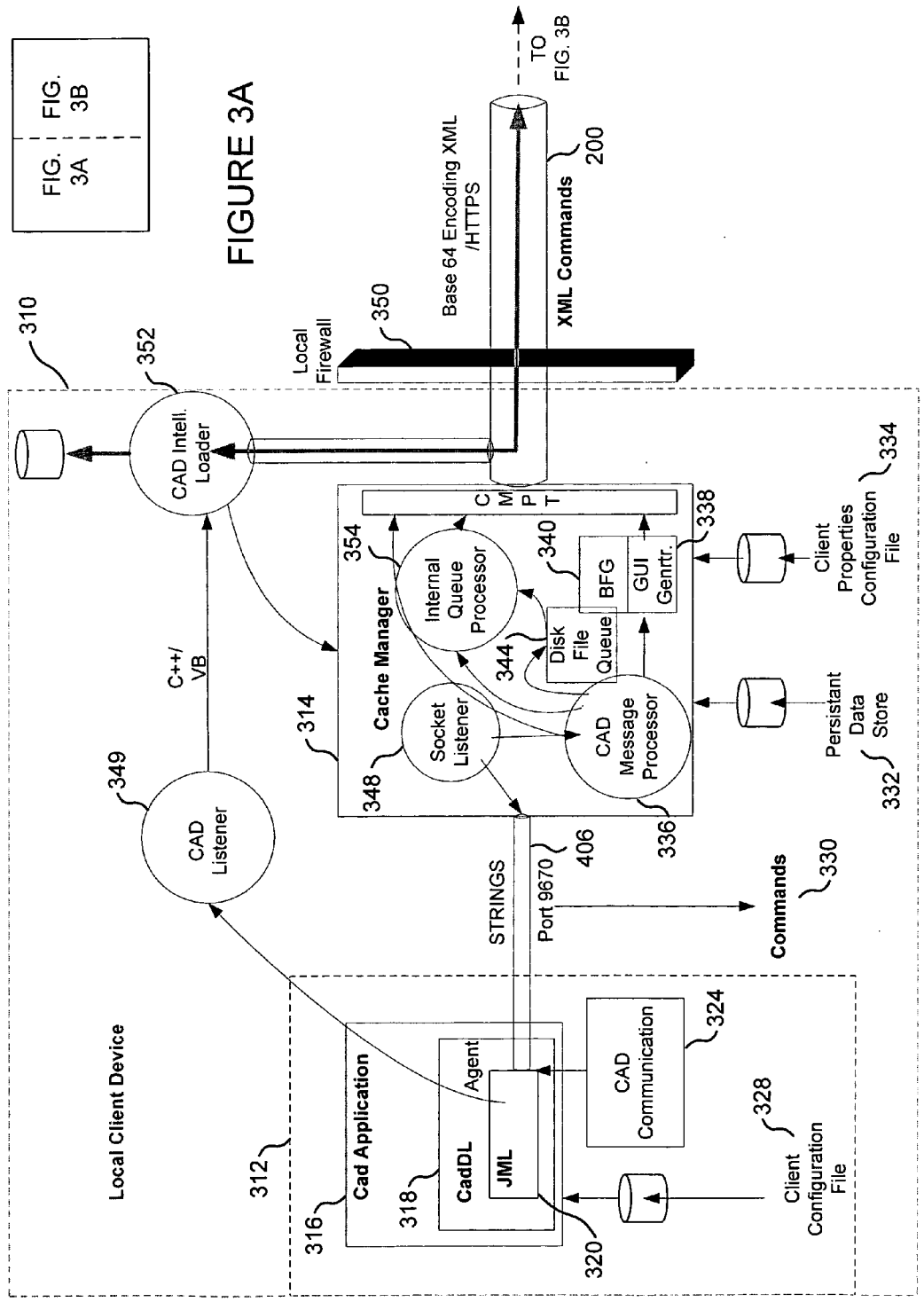
FIGS. 3A and 3B is a still further detailed block diagram depicting the modules of the system of the present invention.
Figure 3B:
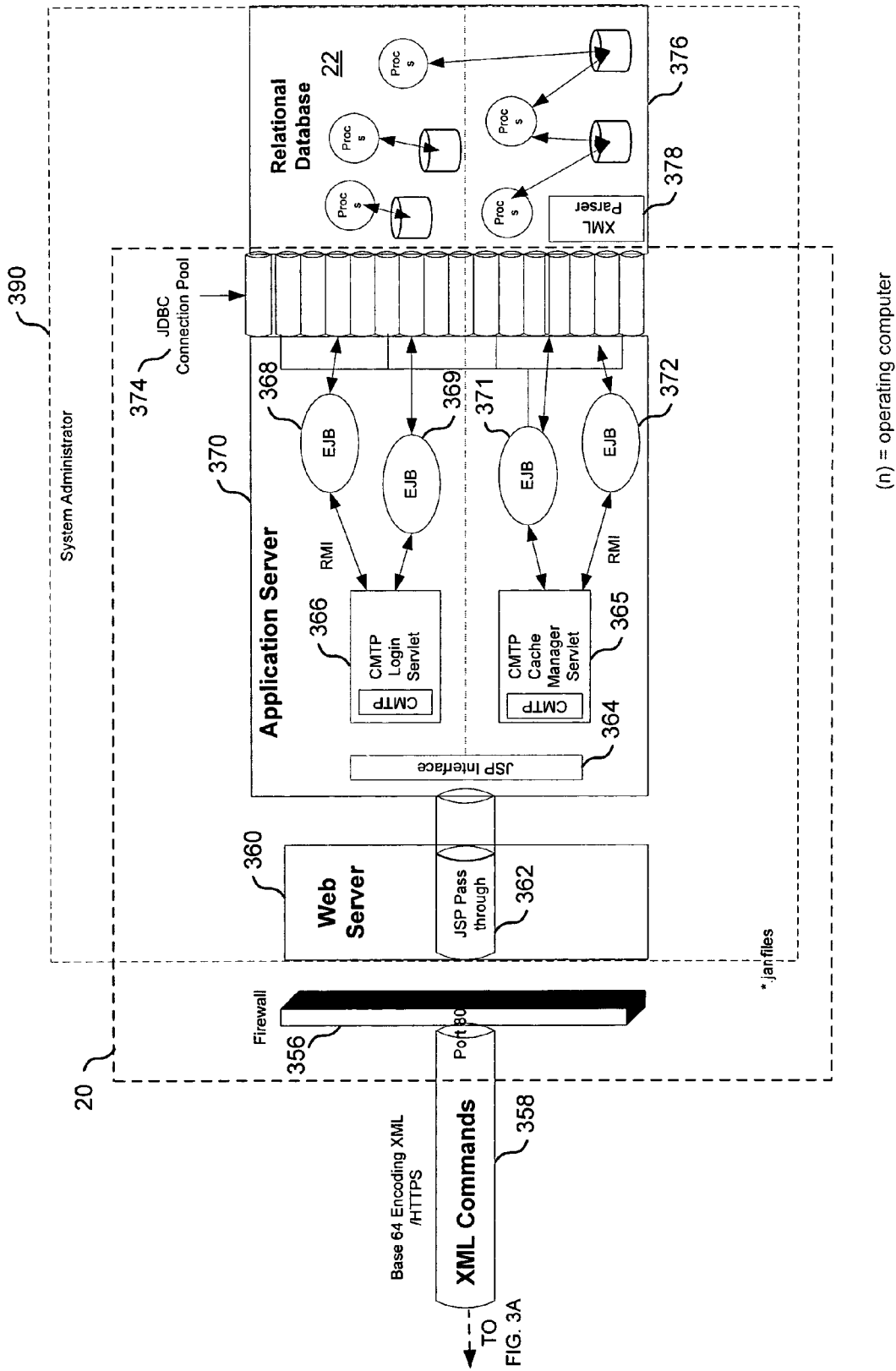

A more detailed representation of the host system 390 is shown in FIGS. 3A and 3B. In one embodiment, the update and information messages are transmitted by providing data in XML format. In the system of the present invention, XML data is provided directly to a cache manager, serialized, and forwarded from the CAD systems to a host system with minimal latency.

In one embodiment, the system may perform several caching functions of data passing between the database 22 and the user on a CAD system, and hence is referred to herein as a cache manager. The object of the intelligent object builder or CAD agent is to transform graphical data from within any CAD software package into intelligent data objects. Using an object-oriented, two- or three-dimensional CAD package and the Web-based application software, uniquely identified drawn objects link to specification data, creating intelligent objects. The Cache Manager facilitates the communication between the two pieces of software.

FIGS. 3A and 3B show a further detailed view of a system on which the present invention is implemented. FIG. 3A shows an exploded view of the local or client computer 310 communicating via a public or private network such as the Internet 200 with a host system 390 provided by, for example, a system administrator. The host system 390 may incorporate the interface system 20 and the central database 22.

A hardware architecture for the machines, server or other devices such as computer 310 or one or more multiple computers making up system 390, which are used to implement the present invention should be well understood to one of average skill in the art. Suitable hardware includes one or more processors, a memory, a mass storage device, a portable storage device, a first network interface, a second network interface and I/O devices, in communication with each other. The choice of processor is not critical as long as a suitable processor with sufficient speed is chosen. The memory can be any conventional computer memory. The mass storage device can include a hard drive, CD-ROM or any other mass storage device. The portable storage can include a floppy disk drive or other portable storage device. If the computer is acting as a router, it includes two or more network interfaces. In other embodiments, the computer may include only one network interface. The network interface can include a network card for connecting to an Ethernet or other type of LAN. In addition, one or more of the network interfaces can include or be connected to a firewall. I/O devices can include one or more of the following: keyboard, mouse, monitor, display, printer etc. Software used to perform the methods of the present invention are likely to be stored in mass storage (or any form of nonvolatile memory), a portable storage media (e.g. floppy disk or tape) and/or, at some point, in memory. The above described hardware architecture is just one suitable example depicted in a generalized and simplified form. The present invention could include dedicated hardware, a dedicated router with software to implement the invention or other software and/or hardware architectures that are suitable.

The system incorporates existing protocols used to transmit data via networks. The common protocol in use on the Internet is Transmission Control Protocol (TCP), Internet Protocol (IP) or TCP/IP. One common protocol in use on the internet is HTTP. The Hypertext Transfer Protocol (HTTP) is the set of rules for exchanging files (text, graphic images, sound, video, and other multimedia files) on the World Wide Web. Relative to the TCP/IP suite of protocols (which are the basis for information exchange on the Internet), HTTP is an application protocol. HTML (Hypertext Markup Language) is the set of markup symbols or codes inserted in a file intended for display on a World Wide Web browser page. The system of the present invention may be configured to communicate via these protocols, wrapping data and commands in Xerces and SOAP programs embedded within it to wrap the XML commands so that they look like HTML.

HTTP can contain references to other files whose selection will elicit additional transfer requests. Any Web server machine contains, in addition to the HTML and other files it can serve, an HTTP daemon, a program that is designed to wait for HTTP requests and handle them when they arrive. A Web browser is an HTTP client, sending requests to server machines. When the browser user enters file requests by either "opening" a Web file (typing in a Uniform Resource Locator) or clicking on a hypertext link, the browser builds an HTTP request and sends it to the Internet Protocol address indicated by the URL. The HTTP daemon in the destination server machine receives the request and, after any necessary processing, the requested file is returned.

In the embodiment of the invention shown in FIGS. 3A and 3B, a network communication path 200 may be implemented via any public or private network, or combination thereof, between the local device 310 and the host system 390. Each of the local computer 310 and the host system 390 may be protected by respective firewalls 350 and 356, and the configuration of communications in the manner discussed above ensures that the communications can pass through these protective firewall devices.

In FIG. 3A, illustrative components of the system of the present invention are shown without reference to the particular hardware configuration described above. In particular, it should be understood that the components illustrated in box 310 are software elements.

In FIG. 3A, the Local computer 310 is shown as hosting a CAD application 312, which may comprise CAD systems include AUTOCAD® by AUTODESK, INC. and MICROSTATION by BENTLEY SYSTEMS, INC.

In one embodiment of the invention, a small piece of software, a CAD agent 318, is downloaded to the client PC 310 from host system 390, installed by a user, and operates as part of the CAD system 312. This software 318 looks and acts like part of the CAD package. The agent includes a client configuration file 328 and a CAD communication class 324 interpreting communications from the CAD package to develop objects in accordance with the disclosure of co-pending applications Ser. Nos. 10/020,552, 10/015,903, 10/016,615, 10/021,661 and 09/519,935. The objective of CAD Agent 318 is to transform graphical data from within any CAD software package into intelligent objects. Using an object-oriented, two- or three-dimensional CAD package and the Web-based application software, uniquely identified drawn objects link to specification data, creating intelligent objects.

Also included on the client 310 is a cache manager program 314. The Cache Manager 314 facilitates the communication between the CAD application software 312 and the agent 318. The manager 314 may also be downloaded and installed on the client 310, at the same or a different time as the agent 318. In essence, the cache manager 314 keeps track of and manages data for low latency in reading and writing to the central database 22.

When CAD application 312 is invoked, a CAD Listener 349 launches the CAD Intelligence Loader (Cl Loader) 352, which checks the program update files on the system host 390 to ensure that the software is up to date before invoking the cache manager. This ensures that the cache manager has the same unique ID numbers (UID), described below, as the web server 390.

The cache manager 314 includes a socket listener 348, a CAD message processor 336, a disk file Queue 344, an internal queue processor 354, a GUI generator 338 and an interface 340 to a Cache Manager Transmission protocol (CMTP). The cache manager program 314 has its own persistent data store 332 and client properties configuration file 334. The socket listener 348 picks up the string commands 330 from the agent 318. These commands 330 then pass through the CAD message processor and are stored in disk file queue 344 for upload by the internal queue processor 354. This allows the data to act asynchronously, since the data is actually stored in the queue 344, while it looks to the user as if changes are occurring instantly.

The CAD software 318 communicates with the cache manager 314 via a socket on port 9760, through a set of commands 330, described below, which may include login or upload commands. These commands 330 are asynchronous, meaning data transmission occurs in continuous streams. The CAD communicator 324 handles data before it goes into the socket.

The CAD software 318 communicates with the cache manager 314 via a socket on port 9760, through a set of commands, described below, which may include login or upload commands. These commands are asynchronous, meaning data transmission occurs in continuous streams. The CAD communicator 324 handles data before it goes into the socket.

The host systems 390, shown in FIG. 3B, may include a web server 360 providing an interface for an application server 370. The application server 370 includes servlets and enterprise JavaBeans (EJBs) acting as an interface to a relational database 376 which stores information for the system, in this case intelligent objects. In general, the web server 360 provides the user interface for the user operating the client PC 310. The web server communicates via JSP with an application server 370, which may be a BEA Weblogic Server provided by BEA Systems, Inc. It should be understood that the web server 360 and the application server 370 need not be single processing devices, but may rather each comprise a cluster of processing devices. The application server includes a JSP interface 364 allowing communication with the web server, and a login servlet 366 and cache manager servlet 365. Java Server Page (JSP) is a technology for controlling the content or appearance of Web pages through the use of servlets, small programs that are specified in the Web page and run on the Web server to modify the Web page before it is sent to the user who requested it. An HTML page that contains a link to a Java servlet is sometimes given the file name suffix of .JSP.

The login servlet 366 controls cache manager logins for users on client PCs. The Cache manager servlet 365 performs the functions described below with respect to communications management with the client PCs. Enterprise Java Beans 368, 369, 371, 372 communicate with the login servlets to pass data via a JDBC connection pool 374 to the central database 22. Java Database Connectivity (JDBC) is an application program interface (API) specification for connecting programs written in Java to the data in popular databases. In one embodiment, the central database is a relational database such as that provided by Oracle Corporation. The system also includes an XML parser 378, which receives data in XML format and stores it in the format of the central database 22.

All commands (commands 200 in FIG. 3A and commands 358 in FIG. 3B) between the client and host system pass between the client 310 and the host systems 390 using a cache manager transmission protocol (CMTP). CMTP serializes the data via base 64 encoding, so that objects can pass through the Internet and browser applications as HTTPS files. It should be recognized that other encoding schemes may be utilized in accordance with the present invention. Data from the CAD application 312 in the form of intelligent objects is converted into XML for transmission between client 310 and host system 390. CMTP has Xerces and SOAP programs embedded within it to wrap the XML commands 200 and 358 so that they look like HTML. This allows the code to pass through local firewall 350 and host system firewall 356 via the standard TCP Internet port (port 80).

All of the operations discussed above are local to the client PC until they pass through the local firewall to the host server. The web server 360 recognizes the wrapped code as JSP; therefore, it passes straight through to the JSP interface 364, as indicated at 362 in FIG. 3B. CMTP then filters the wrapper and re-serializes the super-flat code back to XML for use by the parser 378.

The cache manager 314 operates as a fully authorized server on the client PC 310. The manager 314 also functions as a broker for generating Globally Unique Identification (GUID) numbers, described below. Each data object created in CAD and made intelligent has a GUID to identify it within the system. This ensures that each object and its associated intelligent information is uniquely identifiable from every other data object within the system, regardless of when or where the object creation occurred.

Data types include:
Specifications and Specification Types
virtual areas
Documents and Collaborations
Classifications
Disciplines; and
Other data types as determined by business needs
  Examples of how intelligent objects use real data are set forth below.

The cache manager application may be created in multiple instances. Each instance of cache manager 314 is responsible for creating GUIDs for each data object that passes through it to the host system servers. Should an individual instance of cache manager loose track of its count at the client PC, the host servers also track the ID and count of each installed cache manager instance. The next time cache manager logs on, the host servers refresh the local count information for the cache manager, ensuring that all data objects are consistently and correctly numbered.

Figure 4:
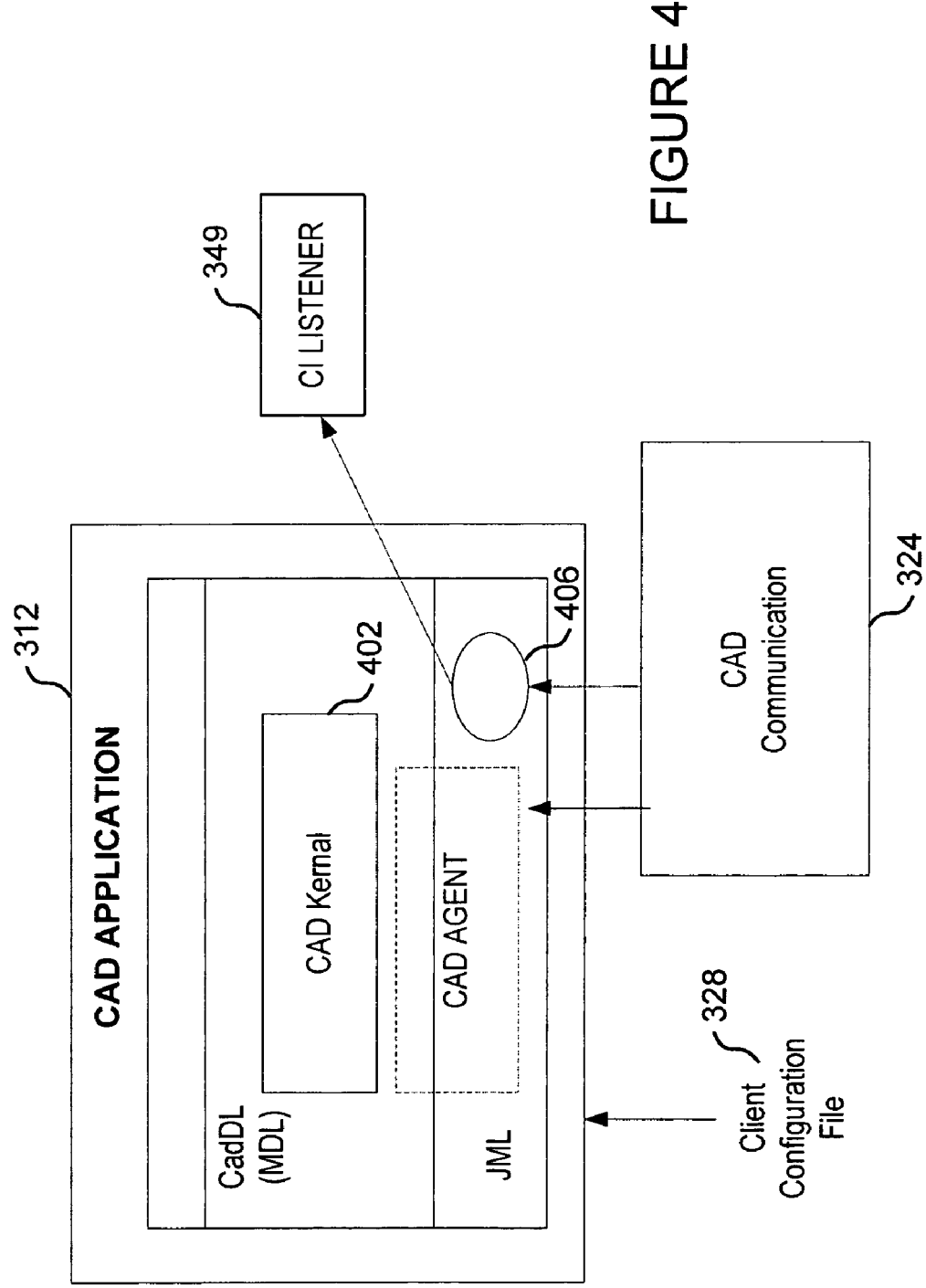
FIG. 4 is an enlarged block diagram of the components of a CAD application and the functional elements of a CAD agent operating in the system of the present invention.

FIG. 4 is an enlarged view of the CAD application 312. As shown therein, the CAD agent application sits on top of the CAD kernel 402 and is built using JAVA (JDML) and CAD specific API language (here illustrated as CadDL). When using Bentley's Microstation application, one may use MicroStation Development Language (MDL) which is a complete development environment that lets applications take full advantage of the MicroStation CAD engine.

Configuration files 328, built in the native CAD development language, open a GUI start menu within the CAD application in accordance with well known principles. This menu may be added to the standard menu line of the CAD application. In one embodiment, these may include a CAD Agent class path (classpth), a Cache Manager class path (cmclasspth), an Install directory (install), a CadDL files auto run design start up (mdldgnstartup), and a catalogue directory that reads all configuration files (CAT_DIR). When the CAD application is launched by the user, one command call order which may be used is CAD initialize, display an Administrator Splash Screen, and create a virtual manager dynamic link library (VM.DLL) for the Cad Listener and Cache Manager. This accomplishes loading CAD agent 318 and registering the command class to the CAD application 312, to allow the agent 318 to act as regular CAD application commands.

The command order within the CAD agent 318 is: Start CAD Agent Loader, Start Virtual Machine (CAD Listener), and Start Virtual Machine (Cache Manager). The process IDs for each of these processes are then returned to the virtual machine DLL.

Figure 5:
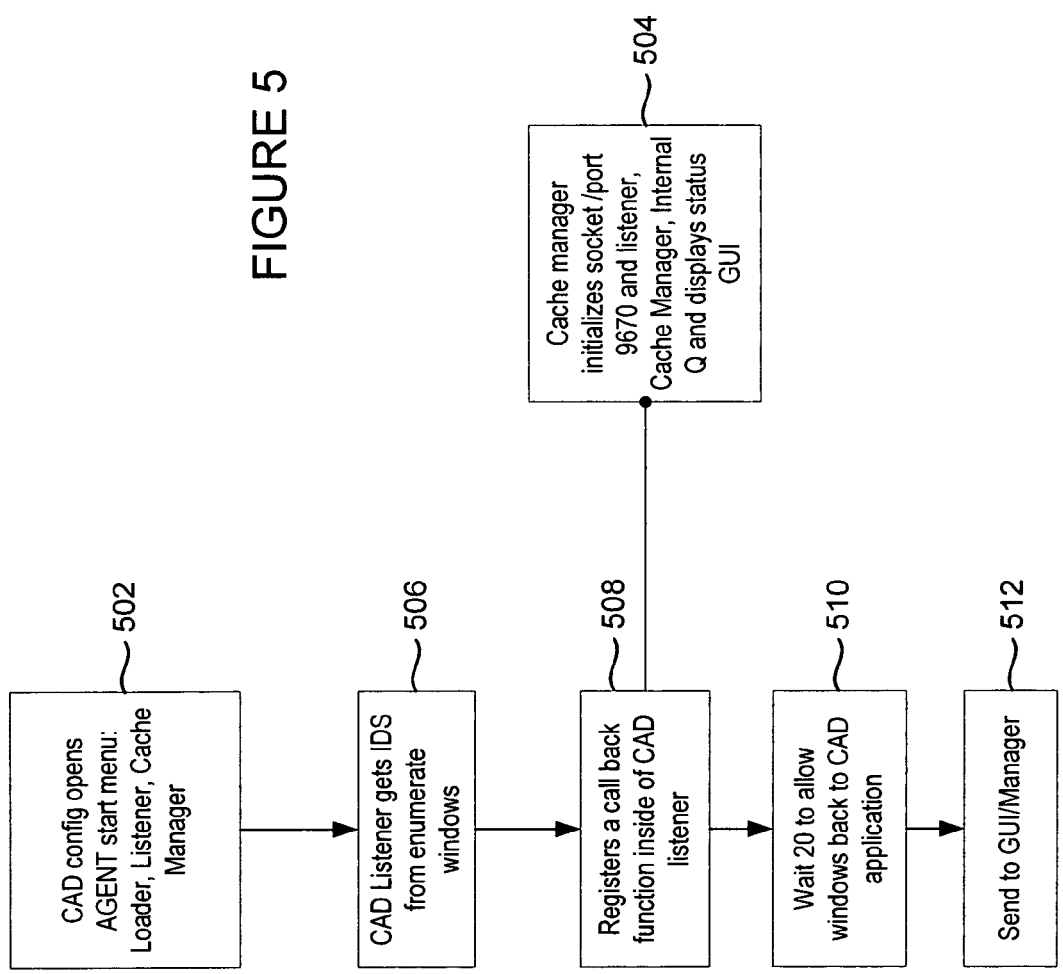
FIG. 5 is a flowchart representing the steps for initializing the cache manager application of the present invention.
Figure 6:
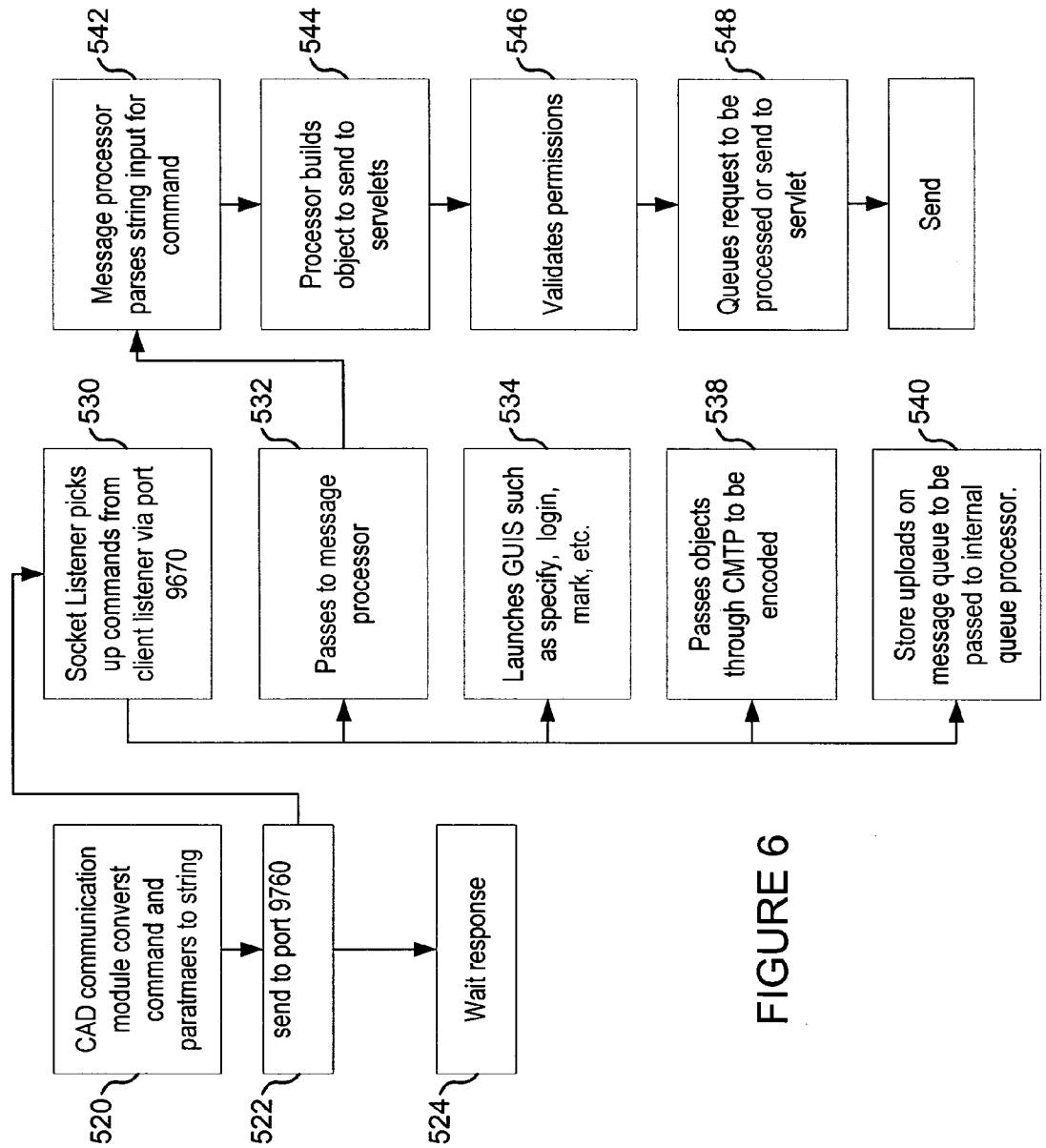
FIG. 6 is a flowchart illustrating the communication process flow for passing data from the client to the system administrator host of the present invention.

An example of how communications are managed by the cache manager is shown is hereinafter described with respect to FIGS. 5 and 6. FIG. 5 represents the invocation process for the cache manager. As shown in FIG. 5, after initialization at step 502, communication between the Agent, Cache Manager, and system host (specifically the servlets 365, 366 on the host,) is used to move data for the intelligent objects to the central database 22. One example of this process is shown in FIG. 5.

CAD listener 349 gets process IDs from enumerate windows at 506, and registers a call back function at step 508 inside of CAD Listener 348, either a cache manager class or CAD class. All Windows operating systems have API calls to enumerate windows. The returned information includes both the process ID and the thread ID. The operating system calls the callback function, for each window and passes its the handle of the identified window. At step 504, Cache Manager 314 initializes socket/port 9670 (port 406 in FIG. 3A and CAD listener 348. The CAD Listener 348 then waits for an interval at step 510, which in one embodiment is a twenty second enumerate interval, to get windows back on top of the CAD application. CAD Listener 348 communicates with Cache Manager via GUIs at step 512.

Once the cache manager is initialized, the manager is ready to receive CAD Communications. This process is illustrated in FIG. 6. CAD communications class 324 takes input to the CAD application 316 and converts it to string format (command p1, p2, . . . ) at step 520. These commands and parameters are output as strings on port 406, implemented as port 9670, to the Cache manager at 522. The Agent 314 waits for additional responses from the manager at 524. CAD Communications 324 is a singleton (a class that can have only one object (an instance of the class) at a time) used by all functions within the CAD application. CAD reply returns all answers.

At step 530, the Socket Listener 348 picks up commands from the CAD Listener via port 9670. It then passes these commands through CAD Message Processor 336 at step 532, which has three functions: at step 534, it launches GUIs, such as specify, login, mark-up, etc.; at step 538 it passes objects through CMTP to be encoded; and at step 540 it stores uploads on message queue 344 to be passed through Internal Q Processor 354.

Upon receipt of messages from the socket listener 348, at step 542, the CAD Message Processor 336, at step 542 parses the string input for requested command. At step 544, it builds CMTP/object (see FIG. 8) to send to servlets 366, 365. It will also, at step 546, validates permissions of the user to perform the requested comment and then, at step 548, queue the request to be processed or sends directly to servlet at 550.

In a further unique aspect, the system provides an Asynchronous Queue Mode which further enables real time access to the user data. The Cache Manager 314 is used as a buffer to store all requests to Cache Manager servlet 365. This allows control to be given back to CAD application 312 faster.

In one aspect, this is performed using a "throttle" mechanism. The throttle mechanism writes information from a File Version Servlet (on the host system, but not illustrated) into a versions.dat file at defined intervals and sizes. In particular, the mechanism opens an HTTP/HTTPS file, downloads the needed file and invokes CAD loader 352. CAD loader marries the required Java programs for the application to the CAD package via the client operating system. The throttle mechanism has two parts: a looping time, which in one example is hard coded at ten (10) seconds; and a block size, which may vary. It should be recognized that the throttle time may be set to different values, and in one aspect ranges from 3-30 seconds.

In one example of uploading 500 objects, approximately 700 ms is required for control to be given back to CAD user, depending on how "throttle mechanism" is set.

Figure 7:
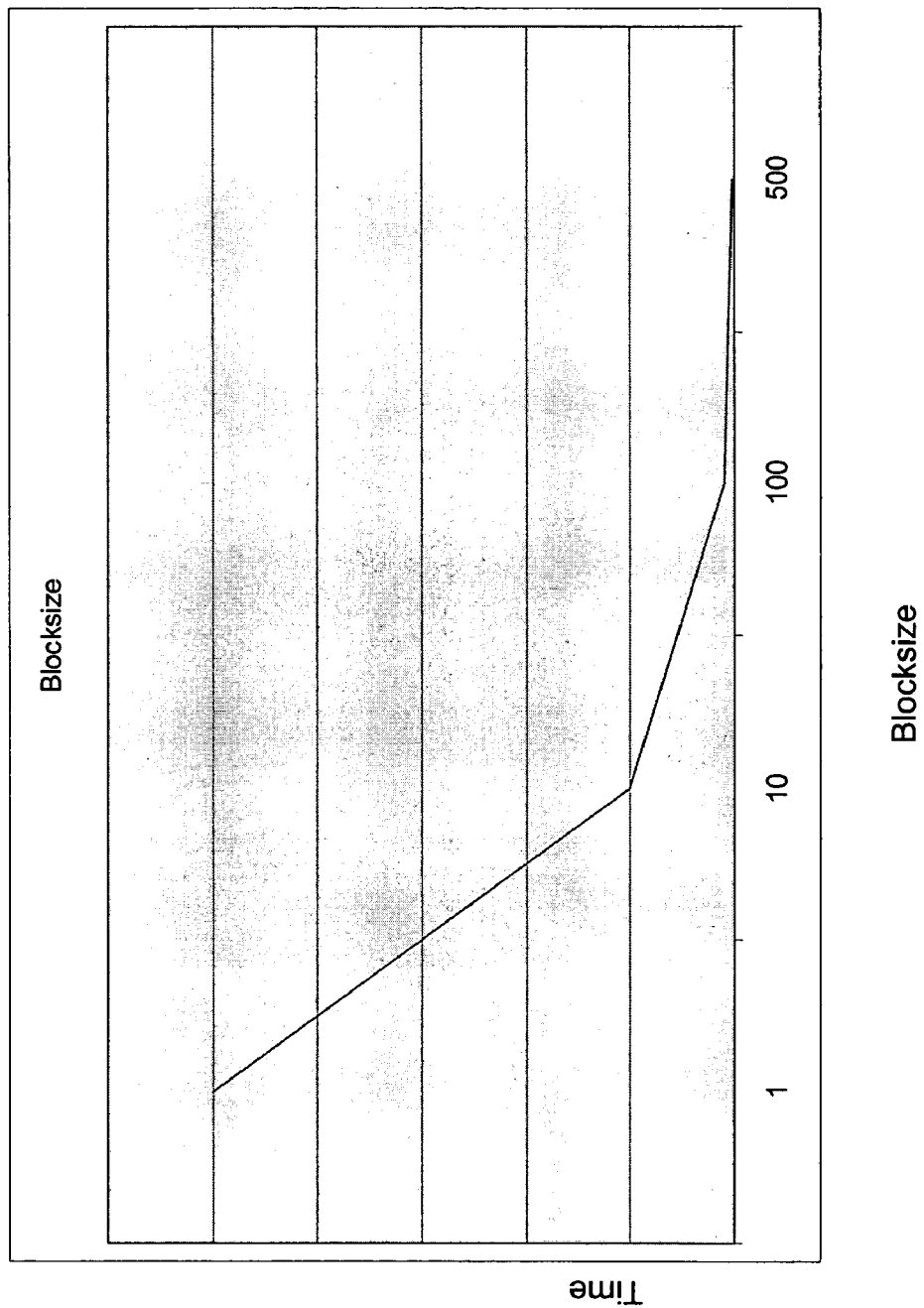
FIG. 7 is a graph of the time window vs. block size relationship in the throttle mechanism of the cache manager of the present invention.

A graph illustrating the relationship between the loop time versus block size is illustrated in FIG. 7. As shown therein, as blocksize increases, the looptime may be decreased.

Figure 8A:
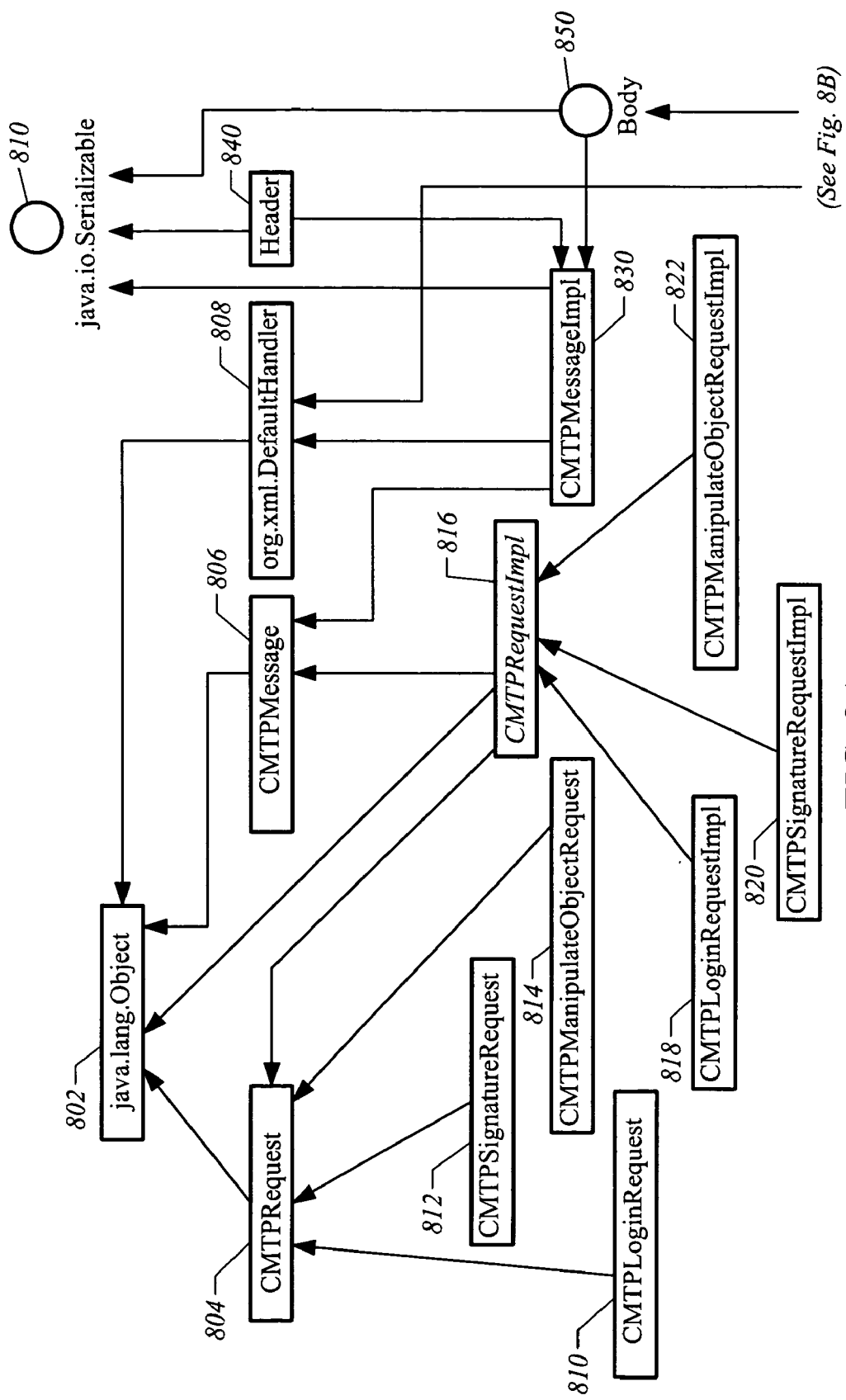
FIG. 8 is a representation of the class hierarchy of the request classes in the cache manager transmission protocol used in the system of the present invention.
Figure 8B:

FIG. 8 is a diagram representing the CMTP Request Class hierarchy used in the CMT Protocol of the present invention. It should be recognized that the Reply hierarchy is similar in that for each instance of the use of the word "Request" in FIG. 8, a "reply" can be used.

As shown in FIG. 8, the object root class java.lang.object has three CMTP specific child classes: a Command request class 804 (CMTPRequest), a message class 806 (CMTP-Message) and the default XML/Java handler class 808 (org.xml.sax.defaultHandler).

The request class 804 includes a login request class (CMTPLoginRequest) 810, a signature request class (CMTPSignatureRequest) 812 (used to create a UserAuthenticationTicket from an XML Element) or a manipulate object request class (CMTPManipulateOgjectRequest) 814 (generally, a flag which indicates current request status of object).

The message class 806 is implemented by a CMTP RequestImpl class, which implements a simple message encapsulating a method call between two active objects. This includes the objects CMTPLoginRequestImpl 818, CMTPSignatureRequestImpl 820 and CMTPManipulateObjectRequestImpl 822.

The CMTPMessageInput class 830 takes as objects the object types listed in table 825. These are the body objects that are serialized and sent to and from the host system 390. An instance of ManipulateObjectRequestBody will contain only one of these at any one time.

Each of these classes are conveyed to the interface java.io.Serializable 810.

As noted above, the system uses Unique Graphical Objects to identify every aspect of the project. To make an object intelligent, the system must recognize the graphical representation of a cell or block within the CAD drawing as a unique graphical object. When a block or cell is placed inside of a drawing within CAD, it is placed at a certain location and orientation within the drawing's universe. The graphical object's location is controlled by the drawing's transformation matrix while its orientation is controlled by the rotation matrix.

To uniquely identify or recognize a block or cell, the object is transformed to the Cartesian coordinate system's center (0,0,0) and rotated by the inverse of its current rotation. The properly orientated object is then iterated. During iteration, each of the object's components are inspected and all vertices of each component are extracted. The X, Y and Z values of each vertex are added together, then the sums of X, Y and Z are each bit shifted and added together.

Example: Subtotal=((sum(x1,x2,x3))shift)+((sum(y1, y2,y3))shift)+((sum(z1,z2,z3))shift).

The linetype of each component and the total number of components in the object are factored into the result of the vertex operations.

Lastly, the radix60 representation of the name of the object is XORed into the subtotal to create the final "cell number". The host server 390 recognizes this cell number as a unique identifier for the graphic object and uses it to associate the object to a specification item or an instance count of that specification item.

Globally Unique Identification (GUID) numbers are generated 64-bit numbers used to identify each data object within the host server 390 database 22. To ensure that each GUID is truly unique, the cache manager 314 uses the following defined structure to create each new GUID:

TYPE+CM SIGNATURE+LOCAL COUNTER=GUID

Predefined types classify the first segment of each GUID. In one embodiment, there are six types utilized within the system, which may be additionally expanded. Examples of ID types include: Spec ID, X-Ref ID, virtual area ID, Instance ID, and Drawing ID.

On initial login, each instance of Cache Manager obtains a unique signature from the host server 390 and saves this information. This signature classifies the second segment of the GUID. Each host server 390 environment can generate up to 4,294,967,295 (4 Billion+) unique cache manager signature IDs for use in identifying each instance of cache manager and any data objects that pass through it. The host server 390 sequences the Cache Manager signatures and tracks the signature assignments. If an instance of cache manager looses its local count, the host server 390 can refresh the information based on the signature ID.

Each instance of cache manager generates the remaining segment of the GUID using a sequenced local count. A single instance of cache manager can generate up to 1,073, 741,823 (1 Billion+) IDs per type. The cache manager sequences the generated IDs of each type for each cache manager at the client PC. The host server 390 tracks this information and can update an instance of cache manager if the local count is lost.

FIGS. 9-14 illustrate data types and user specifications that provide data which may be transmitted in the table 825. Generally, specifications define tangible objects. Each object has a color, quantity and definable characteristics that define its make-up. The system also supports the use of "virtual areas".

Figure 9:
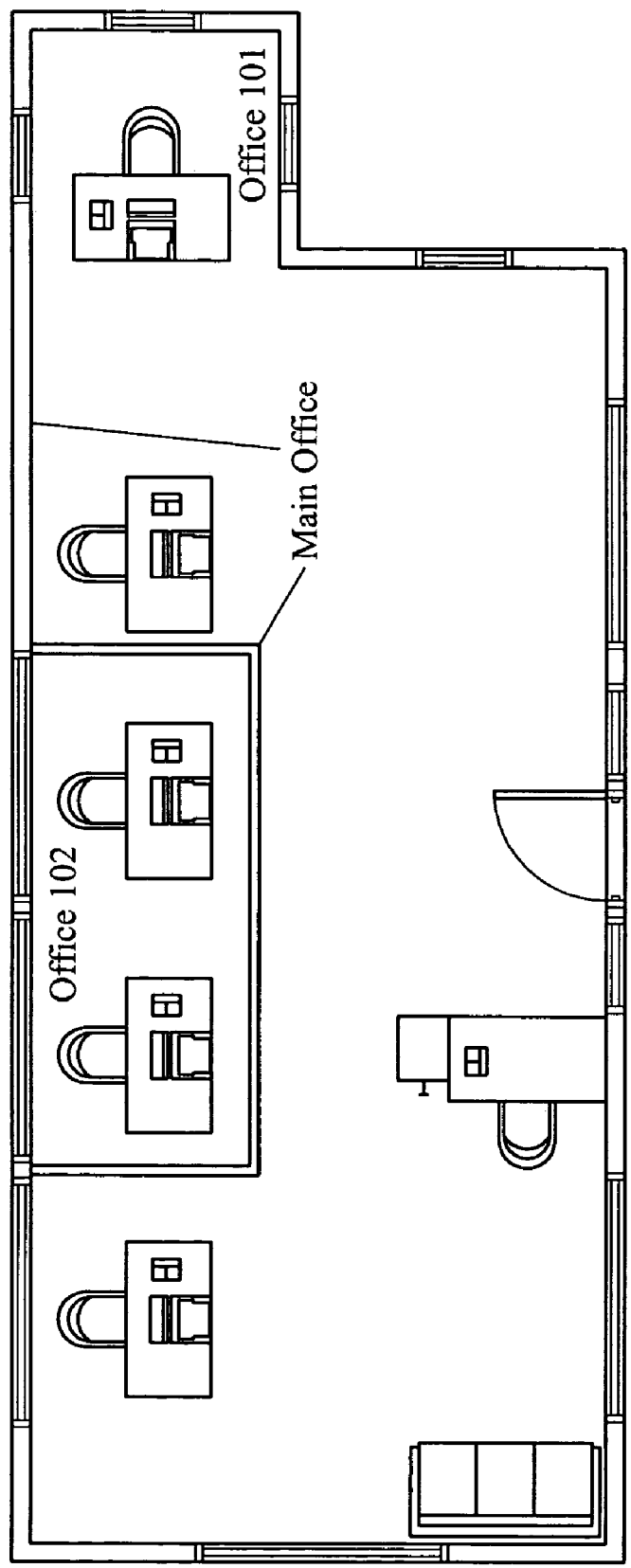
FIG. 9 is a diagram illustrating virtual area definition.

FIG. 9 illustrates the concept of virtual areas. The virtual area is a user-definable representation of a physical space, such as a building. Each virtual area displays as a hierarchal tree structure, defining parent and child relationships for physical spaces. For example, a virtual area can indicate that a building has floors and each floor has rooms. With the aforementioned Intelligent Business System, the assignment of objects to virtual areas helps define the relationship between those objects and physical areas. A complete description of virtual areas is found in application Ser. Nos. 10/020,552, 10/015,903, 10/016,615, 10/021,661, 60/398, 924, and 09/519,935.

Assigning wall types and faces a virtual area allows the definition of parent and child relationships for these objects.

Virtual Area 1 (VA1)—defines all Offices, the outside wall faces and is the upper-most Virtual Area or parent. This contains the wall types and the exterior wall faces (finishes).

Virtual Area 2 (VA2)—defines Main Office, the interior wall faces. This is the second level Virtual Area, or child, of the VA1 Offices.

Virtual Area 3 (VA3)—defines Office 102, the interior wall faces for the inside of the office only and is a child of VA1 Offices. Office 102 is not a child object of Main Office, but would be if the Virtual Area changes to encompass this office. In this example, drawing the Virtual Area around it defines the outside walls of the office. This Virtual Area can also define the wall types for the office walls, or it can inherit the wall type from its parent, VA1 Offices.

Virtual Area 4 (VA4)—defines Office 101, the interior wall faces for the office. The specifications for the wall finishes of this office can override the specifications of Main Office, or can inherit the specifications from Main Office, because it is a child object of Main Office.

Each of the areas defined above may be attached to more detailed information about what is contained in each area in the data structure of the specification.

An example of how properties may change for different items during the design and constructions process is set forth below using types of walls in a building in the virtual areas above as an example.

Figure 10:
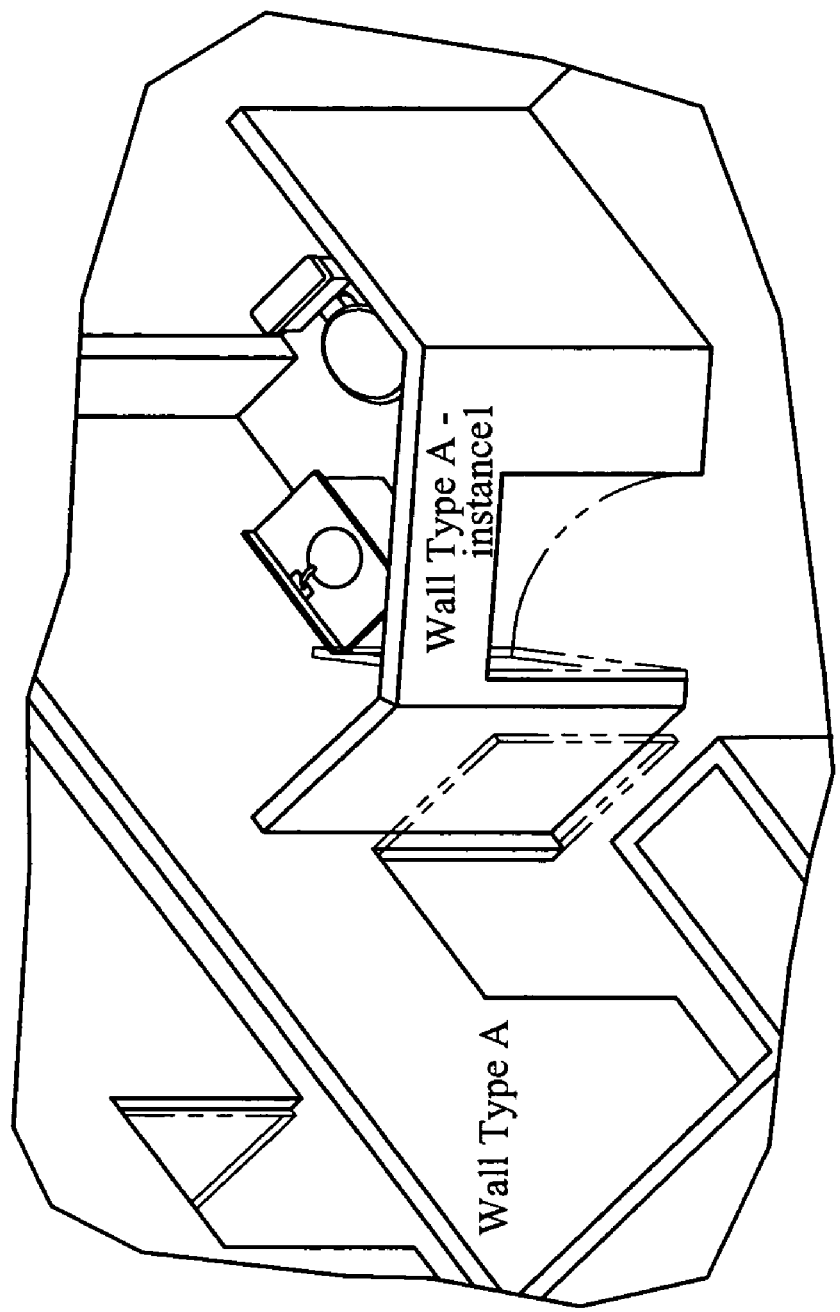
FIG. 10 is a perspective view of a first and second walls in a portion of a building.
Figure 11:
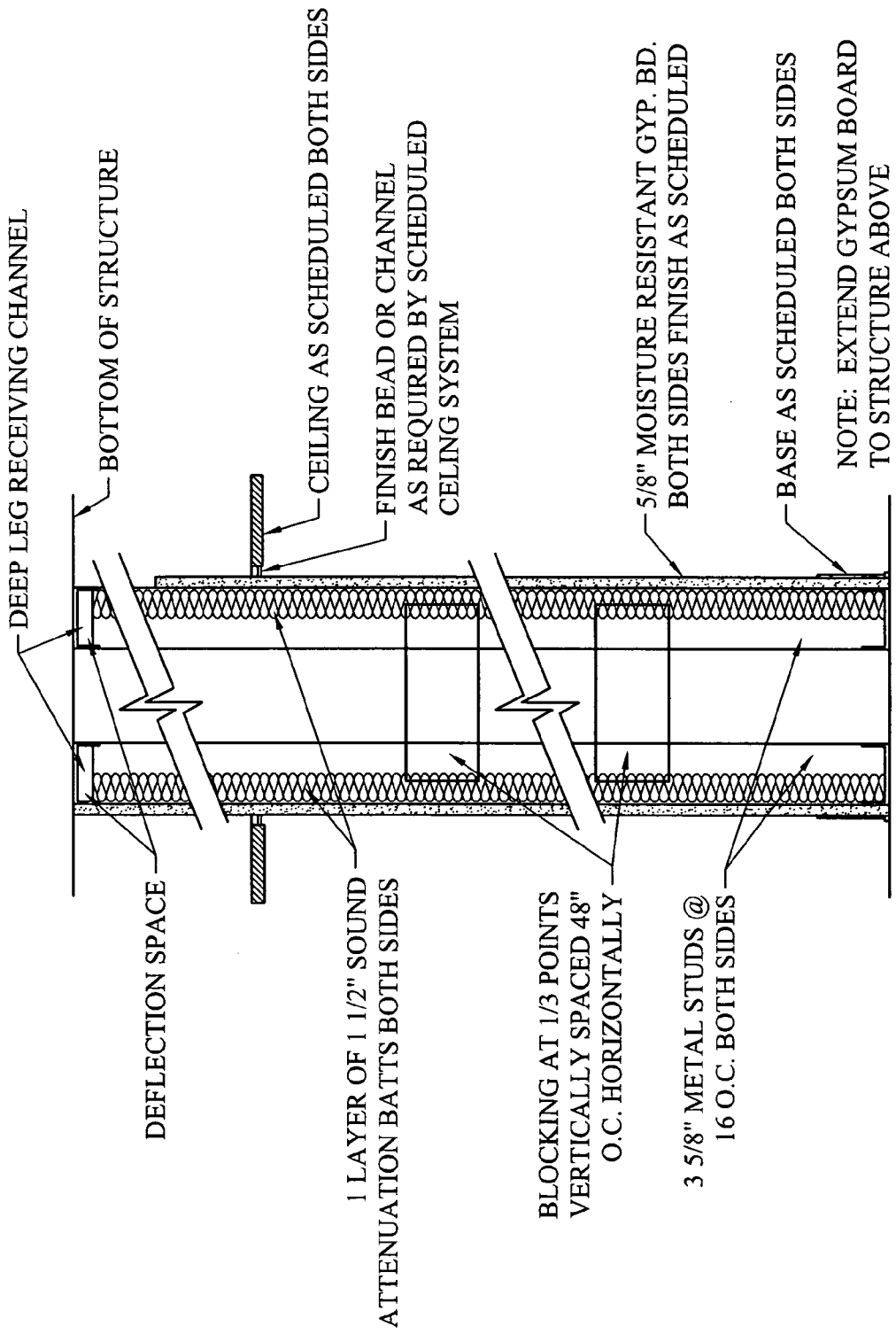
FIG. 11 is an architectural drawing sample of a wall.
Figure 12:
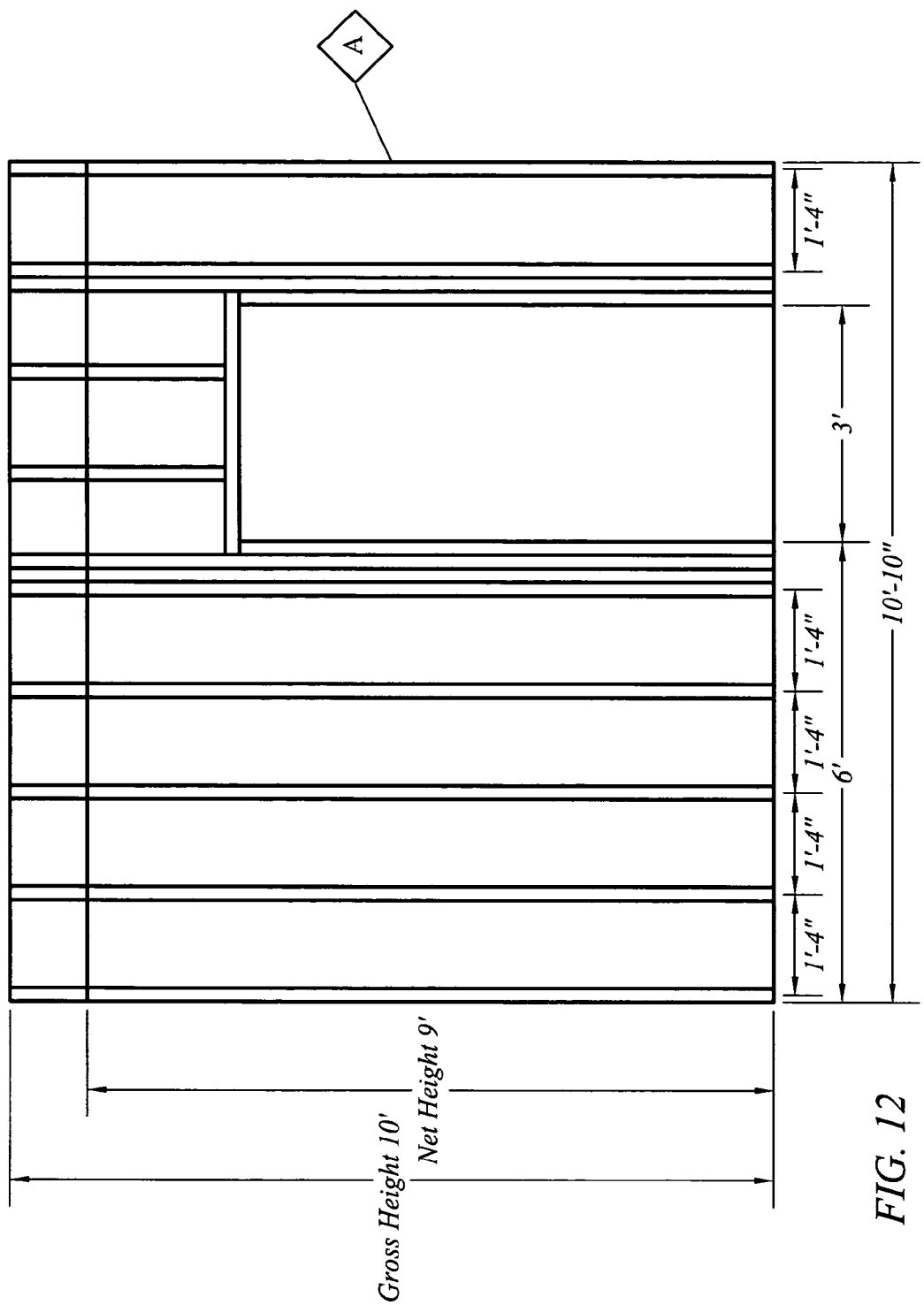
FIG. 12 is a planar view of a sample of a wall.

A perspective view of a series of rooms is shown in FIG. 10. FIGS. 11-12 show additional details of walls which may be included in various specifications and type definitions.

FIG. 10 is a perspective view of a room and is an illustration of a wall height condition. The walls around the bathroom are shorter than the other walls. This being the only difference, creating an instance of Wall Type A and modifying the height reflects the difference. FIGS. 11 and 12 show other information about walls that can be included in a wall type specification.

A wall assembly makes up the Wall Type. The properties for a Wall Type will include such specifications as net height (the height from floor to finished ceiling), gross height (the height from floor to deck slab), length, insulation, stud width, finish bead, clocking type of materials, and notes, as well as other physical properties of a wall assembly.

If a wall changes from a typical wall type to a load bearing wall type, the components of the wall will change as well. The user has the option to change the original wall type and have it update all of the instances, or change a single instance without updating any of the others.

Wall types are defined by the user. Wall types may need to have several different components, depending on conditions. For example, the same wall may exist in two areas, but one wall is a 10' wall while the other is an 8' wall. The system can automatically update the output to compensate for the difference in height using instances.

An instance of a wall type is created when multiple walls have the same basic properties but certain values are different. The result is a wall type showing an overall linear measurement with multiple instances. Each instance shows its respective linear measurement, surface area and any properties that differ from the original wall type.

In the Office Wall Specification is illustrated in FIG. 13, the example shows a spec called office 101-wf-1 as a revision in progress, and illustrates wall types data. The components of the spec include a chair rail (typ-cr-02), white 3"×3" tile (tile-white-3), and wallpaper (wallpaper-white-06). For this example, tile covers the bottom 3' for the length of the wall. This means every linear foot of wall needs three square feet of tile. To cover three square feet takes 48 tiles; therefore, 48 tiles are required for every linear foot of wall that is drawn.

Another part of the wall is the "face". The properties for a wall face include such specifications as the wall finish. The finish could be comprised of several different materials. For example, a wall with a chair rail at 3' from the floor with wallpaper above the chair rail and tile below can all be defined from a single specification for that type of wall finish. To define Wall Faces, the virtual area extracts wall faces from a CAD drawing. When defining a virtual area in a drawing, the user or a virtual area sniffer tool such as that defined in co-pending Provisional Application Ser. No. 60/398,924 outlines a room. This virtual area then defines all of the wall faces. Each segment in the virtual area outline defines a separate wall. If needed, different walls can have different finish specifications. This allows a different finish definition for each side of a wall.

A wall finish for different sized (height) walls can be defined using the same specification. Using the wall finish example from above, the 3" tile can be placed 3' from the floor both on a 10' wall and on an 8' wall. This specification can be set so that the components of the wall will be constant. If the proportions do need to be dynamic, the ratio can be set to increase or decrease with the height of that wall. This can be set with a ratio; the tile is ⅓ the height of the wall.

Another item which may be specified for a wall is Linear Measurement/Surface Area. Selecting a wall from a CAD drawing can derive the linear measurement and the surface area of a wall. Component calculations for a wall—such as the quantity of studs needed for a wall that is 26' long—occur through spec definition, with as much detail as needed. For example, one spec for Wall Type A defines the studs as 16" on center, meaning .75 studs per linear foot. Therefore, approximately 20 studs are required to make a 26' long Type A wall, not including end conditions.

Additional Conditions for a wall may be specified. FIG. 14 illustrates a portion of a wall conditions specification. For a Wall Type specified with 10' studs at 16" on center, the number of studs needed for a given linear distance is known. However, placing a door in the wall starting at 6' from one end of the wall requires the recalculation of studs to accommodate this condition. Door specifications can have two studs on either side of the door to accommodate conditions like this. With the conditions correctly specified, the number of studs needed for the wall can be calculated. Specifying all materials and adding the quantities to the wall creates an accurate estimate of each element specified.

The interface specification shown in FIG. 14 shows that for a given item specification, such as the 2×4 -wb, the system can calculate and track variances in the changes to wall specification definitions. These changes are communicated from the CAD system via the CAD agent and stored in the central database, in accordance with the foregoing disclosure.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method of controlling communications between a client computer and a server computer having a database, comprising:

invoking a data manager application on a client computer, wherein the data manager application intercepts application server requests and data change requests from a client computer aided design (CAD) application, wherein each application server request and data change request is associated with a data instance for a drawing component, each drawing component representing one or more physical entities in a CAD drawing;

assigning a unique identifier to each data instance, the unique identifier derived from location information associated with each data instance and generated at the data manager application;

queuing each data instance on the data manager application prior to transmitting the data instance to the server;

throttling a transmission of two or more data instances to the server using a throttle mechanism; and providing a response to the client application by the data manager application.

2. The method of claim 1, wherein each unique identifier is generated at the client device and derived from coordination information from a vertices contained in the drawing component.

3. The method of claim 2, wherein the drawing component is a computer aided design (CAD) object.

4. The method of claim 1, wherein said step of assigning a unique identifier includes:

generating a unique identifier at least in part from location information of the data instance within a drawing document.

5. The method of claim 1, wherein said step of assigning a unique identifier includes:

generating a unique identifier at least in part from signature information uniquely identifying the data manager application.

6. The method of claim 1, wherein the data queued on the data manager application is associated with a data instance.

7. The method of claim 1, wherein said step of throttling includes:

configuring a loop time parameter and block size parameter; and throttling the transmission of data to a server based on the loop time parameter and block size parameter.

8. The method of claim 7, wherein the loop time and block size can be adjusted based on previous transmission of drawing data.

9. The method of claim 1, wherein said step of transmitting the data to the server includes:

serializing one or more requests; and sending the serialized requests to the server.

10. A data management system for reducing latency in data communications between a client application and a central database, comprising:

a communication agent resident in a client computer aided design (CAD) application on a client device, outputting data;

a cache manager application receiving data from the agent, the cache manager residing in the client device and creating a unique identifier for each data instance, each unique identifier based on coordinate information contained in a drawing component which comprises each data instance, the drawing component associated with one or more physical entities in a CAD drawing, the CAD drawing able to be accessed by the client CAD application;

a disk queue residing on the client device and storing at least selected portions of data from the communication agent; and an encoder residing on the client device and retrieving the data and serializing the data for output to a network.

11. The system of claim 10 wherein the data is provided in XML.

12. The system of claim 10 wherein the each unique identifier is generated at the client device and derived from coordination information from a vertice contained in the drawing component.

13. The data management system of claim 10, wherein said communication agent includes a computer aided design (CAD) communication agent.

14. The data management system of claim 10, wherein the data that is output by said communication agent includes one or more graphical objects.

15. The data management system of claim 10, wherein said disk queue resides on the client device.

16. The data management system of claim 10, wherein said encoder resides on the client device and configures the data to be sent over the Internet.

17. The data management system of claim 10, further comprising:

a throttling mechanism configured to transmit the data to a server based on defined intervals and sizes of data blocks.

18. A system for allowing applications to communicate data to a database on a host system run by a system administrator, comprising:

an agent residing in a client computer aided design (CAD) application on a client device, the agent able to send requests intended for an application server;

a CAD application data interface residing on the client device and able to intercept requests sent by the agent;

a cache manager residing on the client device receiving data from the interface, generating a unique ID for each data instance and throttling transmissions of said data to an application server, the data including drawing component data having a location and dimensions of one or more physical entities within a drawing table to be accessed by the client CAD application, the unique ID based on the summation of one or more sets of vertices values for each drawing component;

an application server including an interface communicating with the cache manager; and a relational database in communication with the application server and able to store the data.

19. The system of claim 18, wherein said cache manager includes a queue, the queue receiving CAD data in response to input received through the CAD application data interface.

20. The system of claim 18, wherein said application server includes cache manager data processing code for processing data received from the cache manager.

21. A method for processing data between a client and a server, comprising:

configuring data by a communication agent on a client device, the data including drawing components representing one or more physical entities having dimension data and location information, the location information including coordinate data of the drawing component within a Computer Aided Design (CAD) drawing;

inserting the data in a queue by a queue manager;

generating a unique identifier at the client device for each data instance, each unique identifier derived from the coordinate information contained in the drawing component comprising at least a portion of each data instance;

serializing the data from the queue; and throttling a transmission of the serialized data to a server in communication with the client device, said step of throttling performed based on predefined intervals and size, the transmitted data including the generated unique identifier for each data instance transmitted.

22. The method of claim 21, wherein the data includes one or more graphical objects comprising the drawing components.

23. The method of claim 21, wherein the communication agent is part of a computer aided design (CAD) application.

24. The method of claim 21, wherein the unique identifier is generated based on vertices coordinate information for the drawing component for each data instance.

25. The method of claim 21, further comprising:

receiving input through an interface on the client device, the input indicating that a graphical object is to be globally updated, said step of configuring data performed in response to said step of receiving input.

* * * * *